United States Patent [19]

Davis

[11] 3,762,561

[45] Oct. 2, 1973

[54] BELT GUIDE AND TENSIONING DEVICE FOR HORIZONTAL FILTERS

[75] Inventor: Steven S. Davis, Bountiful, Utah

[73] Assignee: Envirotech Corporation, Salt Lake City, Utah

[22] Filed: Sept. 3, 1971

[21] Appl. No.: 177,628

[52] U.S. Cl. ............................................. 210/401
[51] Int. Cl. ........................................... B01d 33/14
[58] Field of Search ................... 210/400, 401, 402; 198/202

[56] References Cited
UNITED STATES PATENTS

| | | | |
|---|---|---|---|
| 3,190,451 | 6/1965 | Holland | 210/401 X |
| 2,725,757 | 12/1955 | Murphy | 198/202 X |
| 2,720,973 | 10/1955 | Gross | 210/401 X |
| 3,314,545 | 4/1967 | Grabbe et al. | 210/401 X |
| 3,477,583 | 11/1969 | Kripski et al. | 210/401 |

*Primary Examiner*—Samih N. Zaharna
*Assistant Examiner*—T. A. Granger
*Attorney*—Robert E. Krebs et al.

[57] ABSTRACT

Along the lower run of the endless carrier belts in a multiple belt horizontal filter, guides change the elevation of each belt relative to its adjacent belts; the clearance thereby produced between belts allows the mounting of lateral pressure means which push the belt edges to maintain the belts in proper alignment. A pressure-snubber assembly cooperates with the belt drive drum to reduce tension in the lower runs of the belts without causing belt slippage on the drive drum to consequently make the belts more responsive to edge alignment.

7 Claims, 4 Drawing Figures

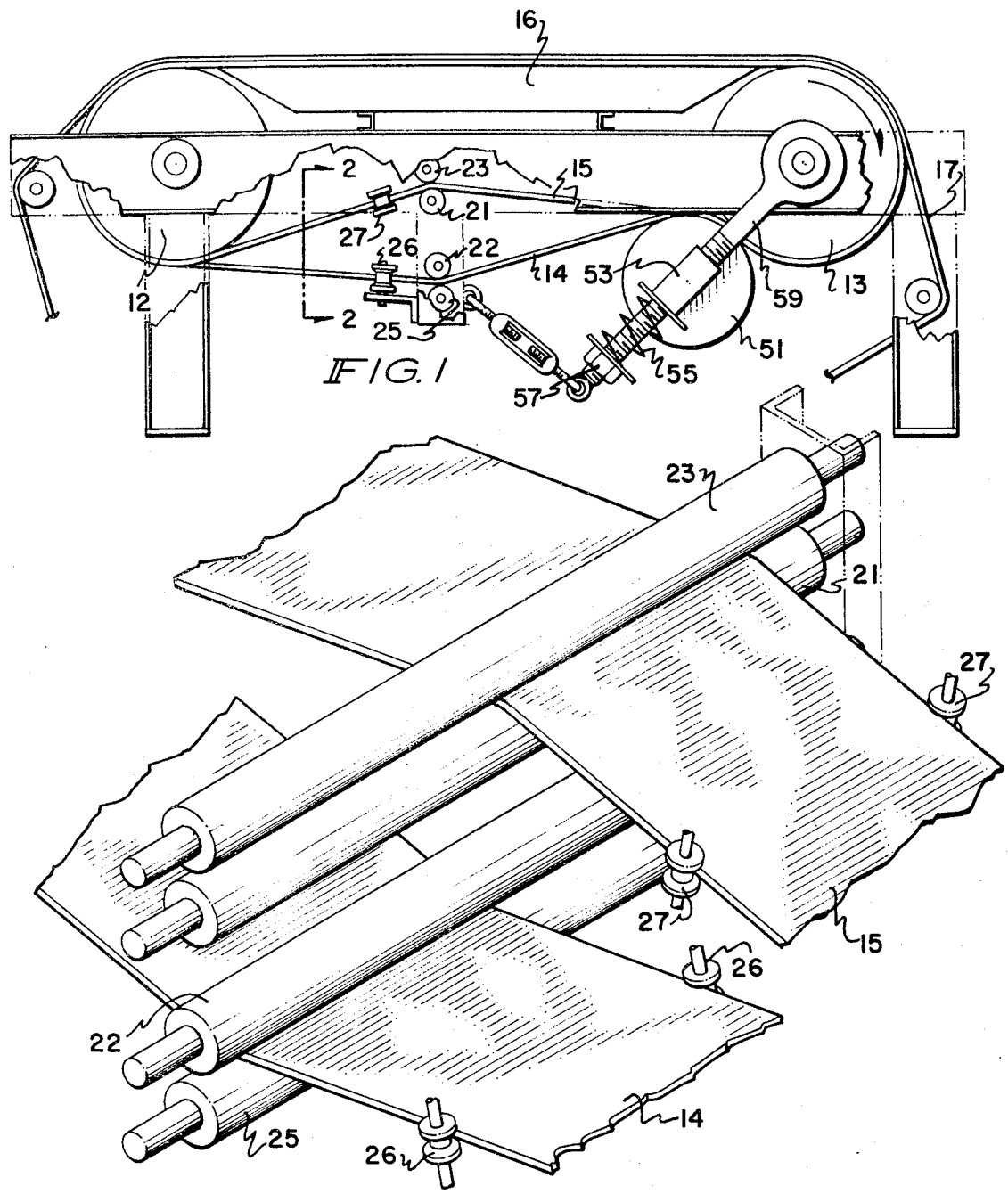

BELT GUIDE AND TENSIONING DEVICE FOR HORIZONTAL FILTERS

FIELD OF THE INVENTION

This invention relates to continuous filtration devices in which an endless web of filter medium is supported and horizontally carried on an endless carrier belt under a slurry so that liquor from the slurry may be drawn down through the filter web, onto and across the belt, and into suction means underlying the upper run of the belt. Generally the carrier belt is supported across such devices by rotatable drums at the opposite ends thereof, and one of the drums is the drive. The filter web is usually separated from the belt adjacent one of the drums, and the filter cake is removed before the belt and web are rejoined to pass again over the suction means. Such devices may be referred to as horizontal belt filters.

Wide filters may utilize two or more coplanar, reinforced-rubber, carrier belts. In some arrangements the belts are medially perforated so filtrate drains therethrough; in other arrangements filtrate drains through gaps left between adjacent belts. With either arrangement, drainage channels are usually formed by parallel grooves extending transversely of the belts. Regardless of the number of drainage belts, usually only a single filter web overlies the belts.

In any multiple belt filter, all belts must be maintained in proper alignment with respect to each other and the filter, particularly through the filtration sequences on the upper run. Misalignment may disrupt cake formation on the filter web or, where a drainage gap is utilized, disrupt the flow of filtrate. Although initially aligned, the belts tend to bias across the drums with use. In some constructions a longitudinal rib is molded to the underside of the belt and the rib engages a track on the filter and/or on the end drums. Although such a design will work mechanically, there are other shortcomings. The cost of belts with such ribs is high, the added surface area of the rib sides rubbing against the track increases friction, and the tracks must always be maintained in accurate alignment which increases the maintenance cost.

Variance in belt length is another problem in multiple belt filters. The longest belt must be tensioned to travel without slippage on the drive drum. Since tension is created by stretching the belt between the end drums, when the longest belt is properly tensioned, the shorter belts may be overstretched thereby causing early belt failure and making belt alignment more difficult. Moreover, the high tension on the shorter belts may overstress other components and may deform the drainage channels.

An object of the invention is to provide, in a horizontal belt filter, means to maintain frictional engagement between the belt and drive drum with minimum tension on the belt;

another object is to provide, in a multiple belt horizontal filter, means to accommodate several belts of different lengths while providing equal tension in all such belts during the filtration cycle while avoiding excessive tension to any of the belts; and another object is to provide means to effect corrective alignment of one or more belts on a horizontal filter so that belts with smooth undersurfaces may be employed and maintained in proper alignment on the filter.

BRIEF SUMMARY OF THE INVENTION

In accordance with the invention, guiding of the belts and the application of corrective aligning forces is accomplished by means pushing against the belt edges as the belt passes through the lower run where it is free to move laterally. When multiple belts are employed, the invention provides means for separating the lower runs of the several belts vertically from each other so that spaces are provided for mounting the edge-engaging aligning devices.

Also, in accordance with the invention, by gripping the belt between the drive drum and a separate gripper roller, sufficient frictional engagement is provided to enable the drive roll to pull the belt through the upper run while permitting the belt to relax on the lower run. This relaxation allows belt alignment correction to be achieved with only light lateral forces applied during the lower run. At the same time the gripper roller provides equal frictional forces between the drum and all the belts even though the belts are of different lengths.

BRIEF DESCRIPTION OF THE DRAWINGS

Further objects and advantages of the invention may be ascertained from the following description and accompanying drawings, which are offered by way of example and not in limitation of the invention, the scope of the invention being defined by the appended claims.

In the drawings:

FIG. 1 is a simplified view of a multiple belt filter embodying the invention;

FIG. 2 is a perspective view taken in the plane of line 2—2 in FIG. 1, looking in the direction indicated by the arrows;

DETAILED DESCRIPTION OF THE INVENTION

Figure 3:
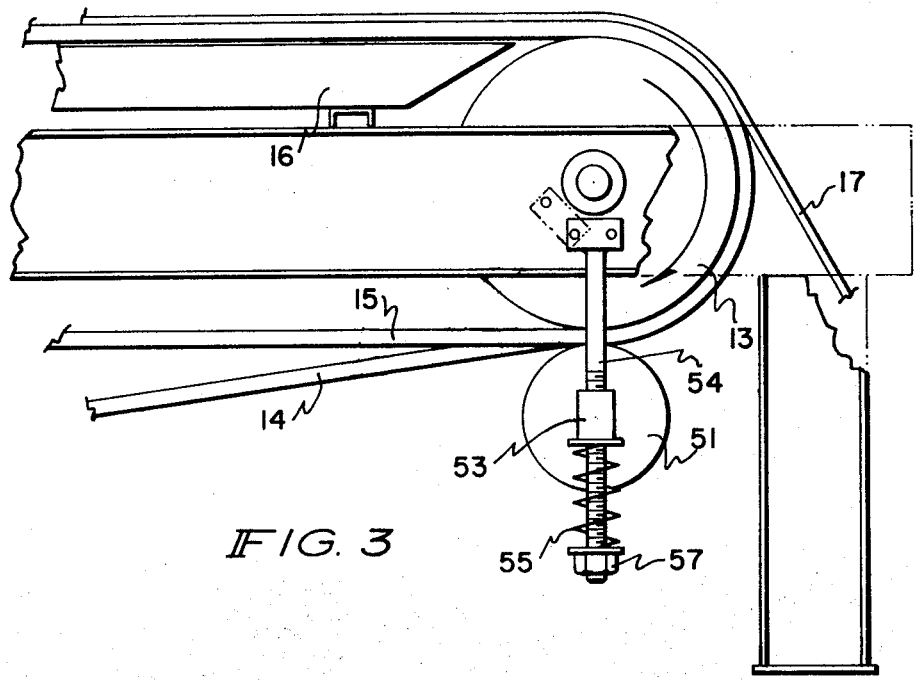
FIG. 3 is a simplified view of the drive end of the filter showing an alternate position of the gripper roller on the filter shown in FIG. 1.

In the embodiment illustrated in FIGS. 1 and 2, horizontally disposed drums 12 and 13 are rotatably mounted at opposite ends of a multiple belt horizontal filter to support at least two endless carrier belts 14 and 15 in coplanar relationship horizontally over a vacuum box 16 which is fixed to the filter frame between the drums. A conventional mechanism, not shown, drives the drum 13 in the direction indicated by the curved arrow to move the carrier belts by frictional engagement. An endless web of filter medium 17 overlies and is carried on the belts under a slurry poured from above the vacuum box. Also provided, but not shown, is a vacuum source which connects to the vacuum box to effect withdrawal of filtrate and air therefrom.

During their lower run, the elevations of the belts are changed so that adjacent belts are at different elevations. Elongated guide rollers 21 and 22, extending transversely of the belts, are rotatably mounted within the frame by any suitable means (not shown in detail) to guide the several belts to the various elevations. Then, rotatable spols 26 and 27, guide shoes or the like, are suitably mounted from the frame (again by means not shown in detail) to be positioned adjacent the belt edges in the spaces between the belts thereby to laterally correctionally align each belt by pushing against its edges.

In FIG. 1, the relative elevation of the belts 14 and 15 is changed by raising upper belt 15 a distance above a horizontal median plane of the lower run and lowering belt 14 approximately the same distance below the median plane; the vertical displacement of both the belts from their natural course, when the belts are of equal length should be equal. Idler rollers 23 and 25 are rotatably supported on the frame to gently pinch the belts against the respective associated guide rollers 21 and 22. The idler rollers may be adjustable and are particularly useful with thinner belts or with belts having a tendency to warp.

Figure 4:
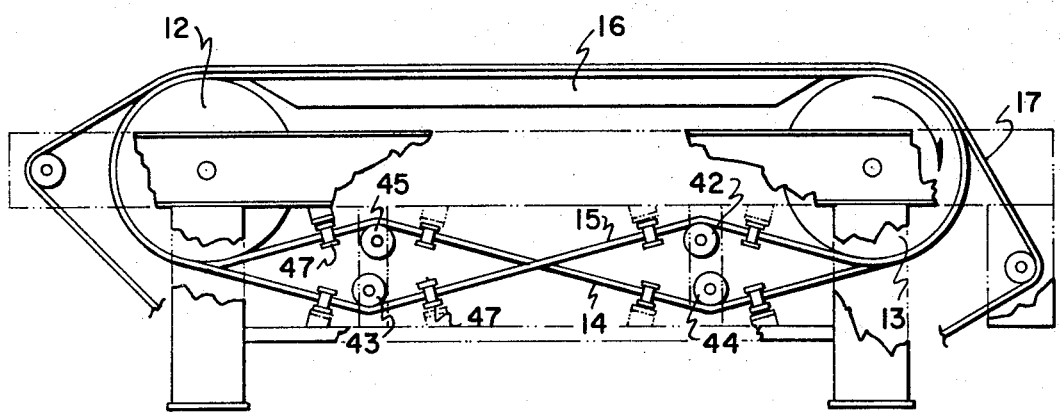
FIG. 4 is a simplified view of a filter embodying another variation of the invention.

An alternative arrangement, FIG. 4, involves raising one carrier belt 15 by a guide roller 42 near the right-hand drum 13 and then lowering that belt by a guide roller 43 near the left-hand drum 12; the other belt 14 is lowered near the drum 13 by a roller 44 and is raised near the drum 12 by a roller 45. Pairs of edge-engaging spools 47 may be provided to correctionally guide the belt before and after it leaves each of the guide rollers. This arrangement permits accommodation of a wider range of belt lengths and more lateral correction.

The efficiency of the above-described lateral guide systems is increased when the tension in the lower run of the belts is decreased, and the pressure-snubber assembly of this invention is designed to permit filter operation with low tension in the lower run of the belts. The tension (working tension) needed to pull the belts across the vacuum box is high because of the need to overcome drag across the vacuum box due to belt weight, slurry weight, and suctional force. It is known that the working tension exerted by a belt around a drive drum is a function of the frictional engagement between the drum and belt and, more particularly, is directly proportional to the tension existing on the other end of the belt (initial tension). In single belt arrangements, the drive and tail drums are simply pulled apart to stretch the belt to provide the requisite initial tension and the drums may be canted to provide belt alignment. In multiple belt systems, especially on long belts (16 to 20 feet), the belt lengths vary and, spreading the drive and tail drums to tension, the longest belt may damage the shorter belts. Moreover, the tension extends through the lower run of the belts thus subjecting the entire belt to continuous tension as well as making belt alignment more difficult. Furthermore, when multiple belts are utilized, belt alignment cannot be accomplished by canting of the drums.

The present invention is predicated on the discovery that, if the frictional engagement between the belt and drive drum is increased by forces applied solely at the drive drum, the need for initial tension at the opposite end of the belt (that is, at the tail drum) is obviated with the result that the tension in the lower run may be relaxed. The gripper roller of the pressure-snubber assembly of this invention accomplishes that result. That is, the pressure-snubber assembly provides belt drive without slippage but with reduced initial tension.

In the embodiment shown in FIG. 3, the pressure-snubber roller assembly comprises an elongated gripper roller 51 which extends transversely of the belts and which is mounted on a shaft suitably journalled for rotation in a bearing carried by a block 53 mounted to slide on arm 54 in response to the urging of spring 55 in compression between the block and an adjustable stop such as nut 57 threaded on the arm. The upper end of the arm may be fixed to a frame member at a selected fixed angle. As illustrated, the spring 55 urges the idler roller 51 against the belts near the bottom of the drum, thereby increasing the normal and frictional forces between the belts and the drive drum 13 so that the belts may run upon the drum without slippage and with reduced tensions in their lower runs.

Belt working tension is also increased by increased wrap of the belt around the drive drum. In FIG. 1 the gripper roller 51 is so mounted that it may be pivoted with respect to the drum's axis to increase the belt area in contact with the drum. The bearing block 53 is mounted on an arm 59 that is pivoted at its upper end and means such as a turnbuckle are provided adjacent the free end of the arm to hold the arm in a pre-selected position. As shown, the idler roll is spring tensioned to both increase the normal force between the belt and drive drum and at the same time to increase the wrap angle. In other respects, that pressure-snubber assembly may be identical with the one shown in FIG. 3. The idler rollers 51 may be rubber covered to prevent damage to the drainage channels formed across the carrier belts.

Although the invention has been described with reference to simplified illustrations, it should be obvious that the various elements such as the guide means (exemplified by rollers 21 and 22) as well as the edge-engaging aligning means (exemplified as spools) may be suitably supported in a variety of ways to provide for rotation and other adjustment. Particularly, the latter may be resiliently mounted to be urged against the belt edges in a manner such that when the belt moves toward a spool, the resistance of that spool toward belt movement will increase while on the edge guide on the opposite spool will "unload" or offer a reduced resistance.

I claim:

1. In a multiple-belt horizontal filter having endless carrier belts of substantially equal circumference trained around drums at opposite ends of the filter to provide a horizontal upper working run whereon said belts are substantially coplanar and a lower return run for the belts, the drum at one end of the filter being a drive drum, the improvement comprising:
   a. guide means supported on the filter frame to engage the lower run of the belts to substantially change the elevation of each belt in said lower run relative to its adjacent belts;
   b. said guide means comprising:
      1. a plurality of rotatable guide rollers mounted on said frame transversely of said belts, at least one of said guide rollers being in a different horizontal plane relative to another one of said rollers, and
      2. elongated idler rollers rotatably mounted on the filter to pinch the belts against corresponding ones of said guide rollers to retain said belts flat;
   c. lateral pressure means mounted on the filter and located in the clearance provided by the changed elevations of said belts and arranged to act against the edges of said belts to correctively maintain said belts in parallel alignment by lateral inward pressure on said edges.

2. The improvement according to claim 1 wherein said guide means comprises at least one elongated guide roller mounted transversely of the belts outside the natural course of the lower run of said belts and alternate ones of said belts are trained to pass in engagement with said roller.

3. An improvement according to claim 1 wherein said lateral pressure means comprises rotatable spools each of which is resiliently mounted on said frame adjacent the edge of a belt in said lower run and is rotatable about an axis substantially normal to the surface of said belt thereby to act against the edges of the belts to maintain belt alignment.

4. An improvement according to claim 1 wherein a first set of said guide means raise alternate ones of said belts to an elevation above a horizontal plane near one end of the filter and lower the same belts to an elevation below the plane near the other end of the filter, and a second set of said guide means, conversely, lowers and raises each intermediate belt.

5. The improvement according to claim 1 with the addition of a pressure-snubber assembly comprising a gripper roller rotatably mounted on the filter transverse of the belts and in contact therewith to press said belts against the drive drum to lessen tension in the lower runs of the belts without belt slippage on the drive drum.

6. The improvement according to claim 5 wherein said pressure-snubber assembly further includes urging means adjustably urging said gripper roller towards the drive drum.

7. The improvement according to claim 5 in which said gripper roller is mounted to pivot adjustably with respect to the axis of the drive drum thereby to selectively vary the wrap of the belts about the drive drum.

* * * * *